United States Patent Office 3,397,039
Patented Aug. 13, 1968

3,397,039
PREPARATION OF ALKALI METAL PHOSPHIDES
Donald J. Peterson, Springfield Township, Ohio, assignor to The Procter & Gamble Company, Cincinnati, Ohio, a corporation of Ohio
No Drawing. Filed May 17, 1967, Ser. No. 639,045
10 Claims. (Cl. 23—204)

ABSTRACT OF THE DISCLOSURE

Process for preparing alkali metal phosphides from alkali metals and phosphorus by effecting electron transfer from the alkali metal to the phosphorus with a carrier material capable of forming radical anions or dianions upon reaction with alkali metals in an ether reaction medium.

FIELD OF THE INVENTION

This invention relates to a process for preparing alkali metal phosphides from the elements, i.e., sodium, potassium, or lithium, and phosphorus. The transfer of electrons from the alkali metal to the phosphorus and the subsequent formation of phosphides having the formula, $M_3P$, is accomplished by employing an organic compound capable of forming radical anions or dianions in an ether reaction medium on interaction with an alkali metal. These organic compounds are hereinafter referred to as "carrier materials."

DESCRIPTION OF THE PRIOR ART

Sodium, sodium-potassium alloy or lithium will react in inert hydrocarbon solvents, under carefully controlled conditions, to form the corresponding alkali metal phosphides having the general formula, $M_3P$, wherein M represents alkali metal and P represents phosphorus. The success of this prior art reaction is highly dependent on several factors. It is necessary to use high temperatures, e.g. 80° C. to 145° C.; high speed stirring, e.g. 10,000 r.p.m.; and long reaction times to obtain good yields of the phosphides. In this process, a fine dispersion of the alkali metal is required to obtain a complete reaction and to prevent formation of complex polyphosphides. Moreover, only white phosphorus can be used as red phosphorus is relatively inert. The reaction medium is also critical; only inert hydrocarbons can be used. See Peterson and Logan, "Preparation and Methylation of Alkali Metal Phosphides," J. of Inorganic and Nuclear Chemistry, vol. 28 (1966), at pages 53–60. This process, even with its great dependence on reaction conditions, is probably the best prior art route for obtaining alkali metal phosphides from the elements.

SUMMARY OF THE INVENTION

The process of this invention for preparing alkali metal phosphides has several advantages over the process described above. By utilizing the process of this invention, the formation of alkali metal phosphides can be accomplished at ordinary temperatures and pressures with ordinary mixing techniques and apparatus. The alkali metals can be used in large chunks or in finely divided form without the formation of unwanted compounds and with little effect on the rate of the reaction or the yield. Both white phosphorus and red phosphorus can be used as initial components in this reaction.

Another advantage of this process is that an ether reaction medium can be used instead of the hydrocarbon solvents hereinbefore described. This is especially important as the phosphides of this invention are used primarily as precursors or intermediates in forming other useful compounds containing phosphorus-carbon bonds. For example, the alkali metal phosphides of this invention can be utilized as intermediates in preparing (1) long chain alkyl dimethyl phosphine oxides, useful as surface active agents; (2) phosphonium salts, useful as flameproofing agents; and (3) tributyl phosphine and tributyl phosphine oxide, both of which are useful as rare earth metal extractants. These compounds can be formed most easily by subsequent reactions of the alkali metal phosphides in an ether reaction medium. Therefore, separation of the alkali metal phosphides from the reaction medium of this process is generally not required.

The process of this invention having the above advantages as well as other advantages which will become apparent from reading the specification, comprises the steps of:

(1) dissolving a carrier material in an ether reaction medium; said carrier material being capable of forming radical anions and/or dianions in ether solution upon reaction with an alkali metal;

(2) adding alkali metal to the solution of Step 1 and agitating the resulting mixture for sufficient time to form radical anions and/or dianions;

(3) adding phosphorus to the mixture of Step 2 and agitating the resulting mixture until the alkali metal phosphide formation is complete; while (4) maintaining in Steps 2 and 3 an inert atmosphere over the mixtures of these steps.

DESCRIPTION OF THE PROCESS

In the first step of the process of this invention, a carrier material is dissolved in an ether reaction medium. These carrier materials form radical anions and/or dianions in ether solution upon reaction with an alkali metal. The radical anions and/or dianions facilitate the transfer of, i.e., "carry," electrons from the alkali metal to the phosphorus. The carrier materials are continually regenerated from the radical anions and/or dianions, as described hereinafter, and are continually reused in this process.

Structurally, the carrier materials are aromatic hydrocarbon compounds which generally contain from about 10 to about 40 carbon atoms. For example, the following carrier materials can be used herein: naphthalene, anthracene, phenanthrene, biphenyl, triphenylene, terphenyl, quaterphenyl, trans - 1,2 - diphenylethene, pyrene, perylene, acenaphthalene and decacyclene. Heteroaromatic compounds containing from about 9 to about 40 carbon atoms can also be utilized herein as carrier materials. For example, the following heteroaromatic compounds can be used herein: quinoline, N-ethylcarbazole, dibenzothiophene and dibenzofuran. Other carrier materials meeting the above definitions are available and can be utilized herein. Most of these carrier materials exist as solids and all of them are soluble (in different degrees) in the ether reaction medium of this invention. Preferred carrier materials for use in this invention are naphthalene and biphenyl.

The reaction medium for the process of this invention can be any of the well-known ethers which are liquid at ordinary temperatures and pressures. For example, the following ethers can be used in this process: dimethyl ether, diethyl ether, methyl propyl ether, monoglyme (1,2 - methoxyethane), diglyme [bis-(2 - methoxyethyl)-ether] and tetrahydrofuran. Monoglyme, diglyme and tetrahydrofuran are preferred for use in this invention.

The amount of ether used in relationship to the carrier material is not critical. The ether should be used in sufficient quantity to dissolve all of the carrier material. No advantage is gained by diluting the carrier material extensively and, therefore, such extensive dilution is not ordinarily practiced. Good results are obtained in this invention when from about 1 to about 5 grams of carrier material are dissolved in about 100 grams of the ether reaction medium.

Agitation of the mixture of ether and carrier material enhances the rate of dissolution of the carrier material in the ether. Agitation can be accomplished by utilizing ordinary and well-known mixing techniques.

The formation of alkali metal phosphides, according to the process of this invention, can be accomplished between the temperature of about −60° C. and about 60° C. Preferably, the temperature is maintained between about 10° C. to 30° C.

In the second step of this invention, an alkali metal is added to the solution of Step 1. The alkali metal is preferably added to this solution in a ratio of gram atoms of alkali metal to gram moles of carrier material of from about 1:0.013 to about 1:0.2. The ratio of gram atoms of alkali metal to gram moles of carrier material is not critical, however, and can be varied from about 1:0.01 to about 1:0.5. When less carrier material is utilized than that indicated above, the reaction proceeds at a slower rate with concomitant increases in cost. When more carrier material is utilized than above indicated, the reaction rate is only negligibly accelerated.

The alkali metals, i.e., sodium potassium and lithium, are soft, very reactive silvery metals. All of the alkali metals and various alkali metal alloys, e.g., sodium-potassium alloy, can be used to advantage in this process. Sodium is the preferred alkali metal for use herein as it is slightly more reactive than lithium in this process, is easier to handle and store than potassium and is commercially available in large quantities at prices lower than those charged for either potassium or lithium.

The alkali metals can be added to the solution of Step 1 as small chunks or these metals can be added in finely divided form. In either case, the reaction will go essentially to completion. Because the formation of radical anions and/or dianions takes place on the surfaces of the alkali metal, the use of finely divided alkali metal can increase the rate of reaction. However, this size reduction can add significantly to the cost of the process and of the end product. The merits of increasing the rate of reaction but, at the same time, increasing the cost of the process should be weighed for individual circumstances.

Shortly after the alkali metals are added to the solution of ether and carrier material, e.g., 1 to 5 minutes, the solution becomes intensely colored due to the formation of radical anions and/or dianions. The color of the solution is dependent on the particular alkali metal, the particular carrier material, and the ether solvent used herein. The colors generally range through various shades of dark green, dark blue, purple and black.

It is postulated that the valence electron of the alkali metals is readily transferred to the hereinbefore defined carrier materials. When a single electron is transferred from an atom of alkali metal to a single molecule of carrier material, a radical anion is formed. This ion is a relatively reactive, negatively charged radical. On the other hand, if two electrons are accepted by the carrier material from two alkali metal atoms, an ion having a double negative charge, a dianion, is formed. This ion, too, is relatively reactive. In actual practice, it is believed that both the radical anions and dianions are simultaneously formed in solution and exist in equilibrium with each other. Formation of the radical anions and dianions using naphthalene as a representative carrier material can be illustrated as follows:

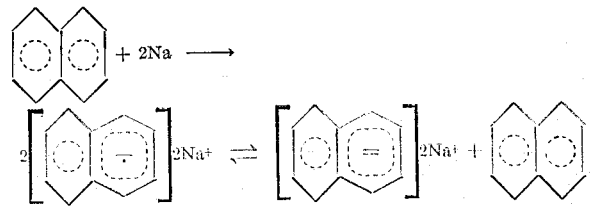

This second step and the remaining steps of the process of this invention must be carried out in an inert oxygen-free atmosphere to prevent undesirable side reactions. Any gas can be utilized as the inert atmosphere in this invention provided that it does not react with any of the reactants or the products of this invention. Argon is an especially desirable inert gas which can be used in preparing the alkali metal phosphides of this invention. Nitrogen can be used as the inert atmosphere only in the preparation of sodium and potassium phosphides as lithium and nitrogen will react.

It is desirable throughout this step and throughout the rest of the process of this invention to agitate the reactants in the ether-carrier material solution. Agitation brings the reactants into intimate contact with each other and, thus, can enhance the rate of reaction and, to a lesser degree, the completeness of the reaction. Agitation can be accomplished with well-known, ordinary mixing devices and techniques.

After the solution is intensely colored indicating the formation of radical anions and/or dianions, phosphorus is added to the mixture of alkali metal and ether-carrier material solution of Step 2. The phosphorus is utilized in this invention in a gram atom ratio of alkali metal to phosphorus of about 3:1. The reaction between the alkali metal and phosphorus, when aided by the carrier material, is essentially quantitative. More or less phosphorus than the stoichiometric amount can be utilized in this invention; however, any advantages gained in this manner are negligible in relation to the serious disadvantage of not reacting a portion of the initial reactants.

Both white phosphorus and red phosphorus can be used as initial reactants in this process. However, the reaction generally proceeds at a faster rate when white phosphorus is used exclusively in this process. Therefore, the use of white phosphorus is preferred.

Addition of the phosphorus to the mixture of Step 2 results in the immediate formation of a finely divided alkali metal phosphide precipitate. When sodium or potassium is utilized herein the precipitate is black; when lithium is used, the precipitate is brownish-black. This reaction goes to about 100% completion in from about 3 to about 10 hours when white phosphorus is utilized. When red phosphorus is utilized herein, the reaction generally takes longer to go to completion, e.g., from about 3 to about 24 hours. The rate of reaction is also dependent to some extent on the carrier material being utilized, the temperature of the reaction medium, the amount of agitation and, to a lesser extent, on the particular ether being utilized as a reaction medium. The relative concentrations of carrier material, alkali metal and phosphorus can also affect the rate of reaction.

The carrier material is not consumed in this reaction but, instead, is continually regenerated and reused in this process. The regeneration of the original carrier material, as well as the formation of the alkali metal phosphides, can be illustrated as follows using naphthalene as representative of the many carrier materials suitable for use herein.

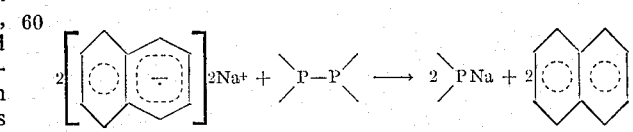

While not wishing to be bound by any particular theory, it is postulated that the transfer of electrons and consequently, the alkali metal, to the phosphorus is greatly enhanced by the use of the hereinbefore described carrier materials capable of forming radical anions and/or dianions. Thus, in this process, electrons are readily transferred from the alkali metal to the carrier material to form radical anions and/or dianions. The carrier material, in turn, transfers electrons and, therefore, the alkali metal atoms, to the phosphorus to form alkali metal-phosphorus bonds in an essentially irreversible reaction. This process is considerably more facile than a direct reaction between the alkali metals and elemental phosphorus.

The alkali metal phosphides of this invention can be separated from the reaction mixture by simple filtration or by most other well-known separation techniques. However, the phosphides made by this process are valuable primarily as precursors in preparing other compounds. Because many of these subsequent reactions are preferably accomplished in an ether solvent, separation of the phosphides from the reaction mixture is generally not practiced.

UTILITY

The alkali metal phosphides of this invention can be separated from the reaction medium and used, per se, as parasiticides or pesticides. Kah, German Patent 698,721 (1940) describes how phosphides are used as parasiticides for grain. The phosphides are simply buried in the grain. The moisture present in the grain gradually acts on the phosphides to form phosphine gas which effectively destroys grain parasites. Phosphides can also be used in poison baits for rodents. See Freyberg, German Patent 720,760 (1942) and East German Patent 11,650 (1956). Phosphine gas liberated from the phosphides can also be used to control bacteria. See Lindgren et al., J. Econ. Entomol., vol. 51, pages 900–3 (1958), Although the alkali metal phosphides can be used directly as bacteria and pest control agents, these compounds are useful primarily as precursors or intermediates in the preparation of other useful compounds containing phosphorus-carbon bonds. For example, the alkali metal phosphides can be treated with butyl bromide to form tetrabutyl phosphonium bromide. Tributyl phosphine can be formed from the phosphonium bromide by heating it. Tributyl phosphine oxide can be formed from the phosphonium bromide by treatment with an alkali, e.g., sodium hydroxide. Both tributyl phosphine and tributyl phosphine oxide are useful in solvent-solvent extraction of heavy metals. See Chemical Engineering, Alkylphosphine Oxides, page 120 (Nov. 7, 1966).

The alkali metal phosphides can also be utilized as precursors in preparing long chain alkyl ($C_{10}$–$C_{16}$) dimethyl phosphine oxides which have valuable surface active and detergent properties. To obtain these compounds, the phosphides are reacted with an alkyl halide, e.g., methyl chloride, to obtain a tetraalkylphosphonium halide, e.g., tetramethylphosphonium chloride. The reaction is preferably carried out in monoglyme, diglyme or tetrahydrofuran. Tetramethylphosphonium chloride can then be heated to form trimethylphosphine. See Maier, Helv. Chem. Acta, 49, page 2458 (1966). Trimethyl phosphine can be converted to long chain alkyl dimethyl phosphine oxides as follows:

$CH_3)_3P + R(C_{10}-C_{16})Br \longrightarrow$

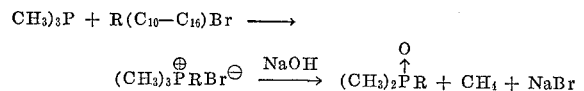

For a complete explanation of this process, see the copending application of Hays, Ser. No. 461,669, filed June 7, 1965.

Examples

The following examples merely serve to illustrate the invention in specific detail and when read in conjunction with the foregoing description will aid in determining the full scope of the present invention. The examples are merely illustrative and are not intended to restrict this invention. All parts, percentages and ratios set forth herein are by weight unless otherwise indicated.

Example I 100 ml. of tetrahydrofuran were placed in a round bottom flask equipped with a mechanical stir bar rotating at about 200 revolutions per minute. An oxygen-free, argon atmosphere was maintained in the flask. 1.28 grams (0.01 gram mole) of naphthalene were added to the tetrahydrofuran. This mixture was stirred until the naphthalene was dissolved in the tetrahydrofuran. To this solution, 2.3 grams (0.1 gram atom) of sodium metal in the form of small chunks were added. After about 5 minutes, the solution was intensely colored due to the presence of naphthalene radical anions and/or the naphthalene dianions. The reaction mixture was stirred for about 30 minutes at which time 1.02 grams (0.033 gram atom) of elemental white phosphorus was added to the reaction mixture. The white phosphorus had been stored in water prior to use in this process and was, therefore dried by sequential washings with ethanol, benzene and tetrahydrofuran. On addition of the white phosphorus to the reaction mixture, an immediate reaction was noted. A finely divided, black precipitate was formed which indicated the presence of sodium phosphide ($Na_3P$). The reaction mixture was stirred for an additional 4 hours and maintained at about 50° C. The reaction went to essentially 100% completion as evidenced by the disappearance of the alkali metal.

The resulting sodium phosphide was reacted with an excess of methyl iodide (21.3 grams; 0.15 gram mole) in the tetrahydrofuran reaction medium to give tetramethylphosphonium iodide. The phosphonium iodide was shown to be present by a $P^{31}$ N.M.R. spectral analysis of the reaction mixture in water which gave rise to a single signal at −23 p.p.m. (relative to 85% $H_3PO_4$). The phosphonium salt was subsequently converted to trimethyl-phosphine oxide by treatment with sodium hydroxide. The overall yield of phosphine oxide was 75% of the possible theoretical yield. This high yield, after the reaction sequence outlined above, indicates that the yield of sodium phosphide obtained from the elements was at least 75% and probably much higher.

Example II

Sodium and lithium phosphides were prepared by the procedure of Example I. As shown by the table below, there were variations in reaction times, reaction temperatures, reaction mediums, carrier materials and the ratio of gram atoms of alkali metal to gram moles of carrier material.

|  | Runs | | |
| --- | --- | --- | --- |
|  | I | II | III |
| Reaction Medium | 100 ml. monoglyme | 100 ml. diglyme | 150 ml. tetrahydrofuran. |
| Carrier Material | 3.08 grams biphenyl (0.02 gram mole). | 1.28 grams naphthalene (0.01 gram mole). | 7.7 grams biphenyl (0.05 gram mole). |
| Lithium |  |  | 0.7 grams (0.1 gram atom). |
| Sodium | 2.3 grams (0.1 gram atom) | 0.7 grams (0.1 gram atom) |  |
| Phosphorus | 1.02 grams (white) (0.033 gram atom). | 1.02 grams (white) (0.033 gram atom). | 1.02 grams (red) (0.033 gram atom). |
| Temperature | 60° C | 20° C | 20° C. |
| Reaction Time | 6 hours | 6 hours | 8 hours. |
| Percent Yield As Trimethyl Phosphine Oxide. | 80 | 75 | 72. |

White phosphorus was used in Runs I and II while red phosphorus was used in Run III. In all cases, the reaction went essentially to completion and was stoichiometric in that predominantly only Na$_3$P and Li$_3$P were formed. The lithium phosphide was brownish-black while the sodium phosphide was black.

Example III

Potassium phosphide is prepared by the procedure of Example I. 1.28 grams of naphthalene (0.01 gram mole) are dissolved in 100 ml. of diglyme. 3.9 grams of potassium (0.1 gram atom) are added to the solution. This mixture is agitated until the solution is intensely colored which indicates the presence of naphthalene radical anions and/or naphthalene dianions. 1.02 grams of white phosphorus (0.033 gram atom) are added to the intensely colored mixture described above. A black precipitate is formed which indicates the presence of potassium phosphide (K$_3$P). The reaction goes essentially to completion in about 3 hours.

Example IV

Results substantially similar to those achieved in the previous examples are obtained when the following carrier materials are substituted for biphenyl and naphthalene in that electrons are effectively transferred from the alkali metals to the phosphorus and alkali metal phosphides are formed; anthracene, phenanthrene, triphenylene, terphenyl, quaterphenyl, trans-1,2-diphenylethene, pyrene, perylene, acenaphthalene, decacyclene, quinoline, N-ethylcarbazole, dibenzothiophene, dibenzofuran.

Example V

Results substantially similar to those achieved in the previous examples are obtained when the following solvents are substituted for monoglyme, diglyme or tetrahydrofuran: dimethyl ether, diethyl ether and methyl propyl ether.

Example VI

Results substantially similar to those achieved in the previous examples are obtained when red phosphorus is substituted for white phosphorus and when white phosphorus is substituted for red phosphorus.

The foregoing description of the invention has been presented describing certain operable and preferred embodiments. It is not intended that the invention should be so limited since variations and modifications thereof will be obvious to those skilled in the art, all of which are within the spirit and scope of this invention.

What is claimed is:
1. The process of preparing alkali metal phosphides from the elements wherein the temperature of the process is maintained between about −60° C. and 60° C. comprising the steps of:
    (1) dissolving a carrier material in an ether reaction medium; said carrier material being selected from the group consisting of aromatic hydrocarbon compounds containing from about 10 to about 40 carbon atoms and heteroaromatic compounds containing from about 9 to about 40 carbon atoms and being capable of forming radical anions and/or dianions in ether solution upon reaction with an alkali metal;
    (2) adding alkali metal to the solution of Step 1 and agitating the resulting mixture for sufficient time to form radical anions and/or dianions;
    (3) adding phosphorus to the mixture of Step 2 and agitating the resulting mixture until the alkali metal phosphide formation is complete; while
    (4) maintaining in Steps 2 and 3 an inert atmosphere over the mixtures of these steps.

2. The process of claim 1 wherein the temperature of the process is maintained between about 10° C. and 30° C.

3. The process of claim 1 wherein the carrier material is selected from the group consisting of: naphthalene, anthracene, phenanthrene, biphenyl, triphenyl, terphenyl, quaterphenyl, trans-1,2-diphenylethene, pyrene, perylene, acenaphthalene, decacyclene, quinoline, N-ethylcarbazole, dibenzothiophene and dibenzofuran.

4. The process of claim 3 wherein the carrier material is selected from the group consisting of naphthalene and biphenyl.

5. The process of claim 1 wherein the ether reaction medium is selected from the group consisting of dimethyl ether, diethyl ether, methyl propyl ether, monoglyme, diglyme and tetrahydrofuran.

6. The process of claim 5 wherein the ether reaction medium is selected from the group consisting of monoglyme, diglyme and tetrahydrofuran.

7. The process of claim 6 wherein the ratio of gram atoms of alkali metal to gram moles of carrier material is from about 1:0.013 to about 1:0.1.

8. The process of claim 7 wherein the alkali metal is sodium.

9. The process of claim 8 wherein the gram atom ratio of alkali metal to phosphorus is about 3:1.

10. The process of claim 9 wherein the phosphorus is white phosphorus.

References Cited

UNITED STATES PATENTS 3,196,139   7/1965   Best _____ 252—441

OSCAR R. VERTIZ, *Primary Examiner.*

H. S. MILLER, *Assistant Examiner.*